US007298393B2

United States Patent
Morita

(10) Patent No.: US 7,298,393 B2
(45) Date of Patent: Nov. 20, 2007

(54) STEREO-OBSERVATION SYSTEM

(75) Inventor: Kazuo Morita, Hachioji (JP)

(73) Assignee: Olympus Corporation, Tokyo (JP)

( * ) Notice: Subject to any disclaimer, the term of this patent is extended or adjusted under 35 U.S.C. 154(b) by 753 days.

(21) Appl. No.: 10/820,105

(22) Filed: Apr. 8, 2004

(65) Prior Publication Data

US 2004/0263613 A1 Dec. 30, 2004

(30) Foreign Application Priority Data

Apr. 9, 2003 (JP) .............................. 2003-105892

(51) Int. Cl.
H04N 13/04 (2006.01)

(52) U.S. Cl. ............................ 348/51; 348/42; 348/53; 348/54

(58) Field of Classification Search ................... 348/42, 348/45, 51, 53, 54; 359/462, 466
See application file for complete search history.

(56) References Cited

U.S. PATENT DOCUMENTS

| 6,075,555 | A | * | 6/2000 | Street ............................ 348/43 |
| 6,163,337 | A | * | 12/2000 | Azuma et al. .................. 348/43 |
| 6,507,359 | B1 | * | 1/2003 | Muramoto et al. ............. 348/47 |
| 6,590,704 | B1 | * | 7/2003 | Yano et al. .................... 359/466 |
| 2004/0109135 | A1 | * | 6/2004 | Watanabe et al. ............. 351/205 |

FOREIGN PATENT DOCUMENTS

JP 08-313828 11/1996

* cited by examiner

Primary Examiner—Vu Le
Assistant Examiner—Jessica Roberts
(74) Attorney, Agent, or Firm—Kenyon & Kenyon LLP

(57) ABSTRACT

A stereo-observation system includes a stereo imaging unit which has at least two entrance pupils and an imaging means forming a first image for the left eye and a second image for the right eye which have parallax and a stereo display unit which has two image display means displaying two images formed by the stereo imaging unit. In this case, the stereo display unit is constructed so that an angle of vergence $\alpha 2$ is made by the line of sight of the left eye of the observer viewing the center of the first image displayed by the image display means with the line of sight of the right eye of the observer viewing the center of the second image displayed by the image display means, and the angle of vergence $\alpha 2$ satisfies the following condition:

$(\alpha 1 - 2\tan^{-1}(d/2L)) \times (w2/w1) \times 0.83 \le \alpha 2 \le \{2\sin^{-}(G/2D) - (2\tan^{-1}(d/2S) - \alpha 1) \times (w2/w1)\} \times 1.2$ where $\alpha 1$ is the angle of vergence (the inward angle) of the stereo imaging unit, d is a distance between the centers of the two entrance pupils of the stereo imaging unit, L is a distance from a far point of the depth of field of the stereo imaging unit to the entrance pupils of the stereo imaging unit, S is a distance from a near point of the depth of field of the stereo imaging unit to the entrance pupils of the stereo imaging unit, w1 is the field angle of the stereo imaging unit, w2 is the field angle of the stereo display unit, G is an interpupillary distance of the observer, and D is a distance from the pupil position of the observer to the observation image.

3 Claims, 17 Drawing Sheets

FIG. 6A
PRIOR ART
FIG. 6B
PRIOR ART
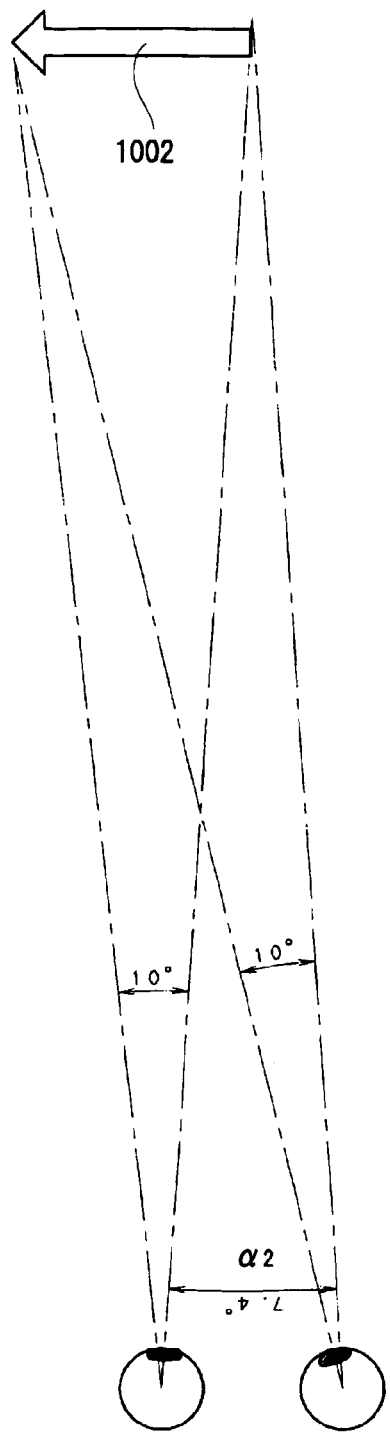
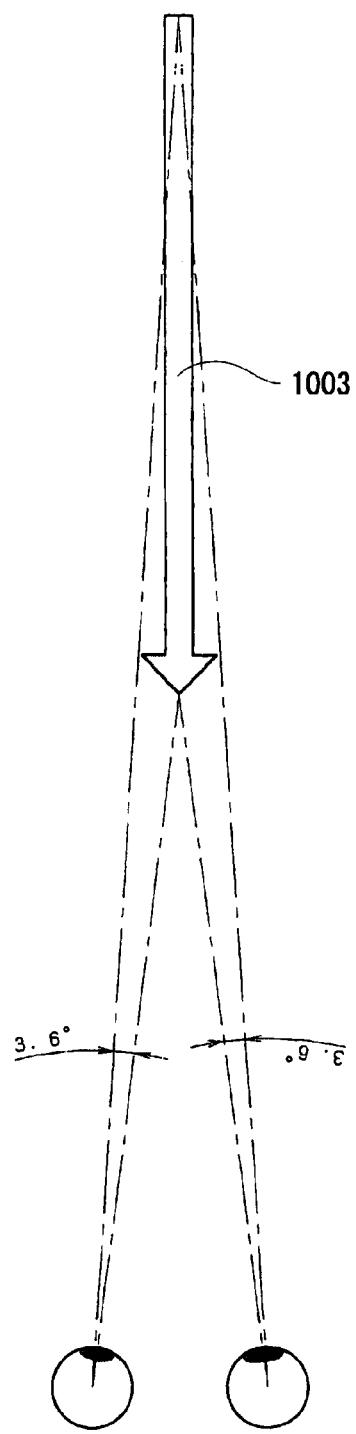

STEREO-OBSERVATION SYSTEM

BACKGROUND OF THE INVENTION

1. Field of the Invention

This invention relates to a stereo-observation system which is suitable for stereoscopic observation on left and right images with parallax, formed by a stereo imaging apparatus, such as a stereo endoscope, having a wide range of depth of field.

2. Description of Related Art

In recent years, the technique of using the stereo-observation system, such as the stereo endoscope, has been popularized in the field of medical treatment, notably surgery.

Originally, the technique of using a conventional endoscope and special treatment tools enables minimally invasive treatment to be received under the endoscope with respect to a disease that has required laparotomy. Furthermore, the endoscope has been designed so that a stereoscopic vision is possible, newly obtained information in a depth direction allows the treatment tool to be securely conducted into the human body, and a higher degree of finer treatment can be received in a shorter time than in the conventional endoscope. Consequently, it is expected that a surgical operation under the stereo endoscope which is a minimally invasive technique will be developed in the future.

In general, the stereo-observation system is of a binocular type, and as shown in FIG. 1, includes three units: a stereo imaging unit 2 incorporating imaging optical systems and image sensors to form left and right images of an observation object 1 with parallax, a stereo image signal processing unit 3 in which a stereoscopic image is produced by the image signals of the left and right images obtained from the stereo imaging unit 2, and a stereo display unit 4 displaying the produced stereoscopic image.

In the stereo-observation system, the images of the object are formed on the imaging surfaces of the image sensors by the imaging optical systems of the stereo imaging unit 2. In order to obtain the left and right images with parallax, various systems are used in the imaging optical systems. The left and light images obtained by the image sensors are transmitted as the image signals from the stereo imaging unit 2 to the stereo image signal processing unit 3. The stereo image signal processing unit 3 performs necessary signal processing in accordance with the stereo display unit 4 provided behind the unit 3. The stereo display unit 4 forms the left and right images on display elements on the basis of the stereoscopic image sent from the stereo image signal processing unit 3.

In order to separately transmit the left and right images to an observer's eyes, various systems are also used in the stereo display unit 4. As a typical example of the system of a stereo display apparatus, there is a virtual-image stereo-observation type in which light is projected directly on the left an right pupils (eyes) of the observer corresponding to the left and right images by optical systems located very close to the observer's face so that image information of a large image plane is equivalently thought of as a virtual image, which is observed stereoscopically.

A system combining the stereo endoscope with the virtual-image stereo-observation type of display apparatus has been proposed (refer to, for example, Japanese Patent Kokai No. Hie 8-313828). The stereo-observation system set forth in this publication establishes the relationship of the field angle between the stereo endoscope and the virtual-image stereo-observation type of display apparatus in order to observe the image of the stereo endoscope in a natural, virtual reality.

The stereo endoscope has a large depth of field like a common endoscope, which is not constructed for a stereoscopic vision, so that the object is captured in the range of the depth of field and is observed at a desired position by moving the stereo endoscope close to, or far away from, the object. The depth of field refers to the limit of an object distance in which the object can be observed without blurring. In the observation, focus adjustment and the adjustment of an angle of vergence, required in accordance with a distance from the stereo endoscope to the object are not made.

FIG. 2A shows this state. In this figure, reference numeral 5 denotes a stereo endoscope; 6, an endoscope holding arm; 7, a virtual-image stereo-observation type of display apparatus; 8, a display apparatus holding arm; and 9, an observer. FIG. 2B shows the enlargement of a distal end 10 of the stereo endoscope 5. Reference numeral 11 denotes an endoscope distal end; 12, a left-hand entrance pupil of a stereo endoscope optical system; 13, a right-hand entrance pupil of the stereo endoscope optical system; 14, an angle of vergence of the stereo endoscope; 15, a focal position of the stereo endoscope; 16, a range of the depth of field of the stereo endoscope; 17, an object located at a position A closest to the stereo endoscope in the range of the depth of field; 18, an object located at a focal position B of the stereo endoscope; and 19, an object located at a position C farthest away from the stereo endoscope in the range of the depth of field.

The observer 9 operates the stereo endoscope to move it backward and forward as mentioned above and captures and observes the object in the range from the position A to the position C. Observation images where the objects are located at the positions A-C are represented by reference numeral 20. Reference numeral 21 designates a pair of observation images when the object is located at the position A; 22, an observation image for the right eye; 23, an observation image for the left eye; and 24, center positions of individual observation images. Images 25 of the object are shifted inwardly from the center positions 24 of the observation images in both the left and right images. Reference numeral 22' designates a pair of observation images when the object is located at the position B; 26, an observation image for the right eye; and 27, an observation image for the left eye. Images 28 of the object are located at the center positions 24 of the observation images in both the left and right images. Reference numeral 23' designates a pair of observation images when the object is located at the position C; 29, an observation image for the right eye; and 30, an observation image for the left eye. Images 31 of the object are shifted outwardlyly from the center positions 24 of the observation images in both the left and right images. As mentioned above, the images of the object in the observation images are sometimes shifted inwardly or outwardly, depending on the distance between the stereo endoscope and the object.

In FIG. 3, reference numeral 32 represents a virtual-image stereo-observation type of display apparatus; 33, an eyepiece optical system for the right eye; 34, an eye piece optical system for the left eye; 35, an image display means for the right eye; 36, an image display means for the left eye; 37, an image of the object shifted outwardly, displayed on the image display means for the right eye; 38, an image of the object shifted outwardly, displayed on the image display means for the left eye; and 29, an observer.

In the virtual-image stereo-observation type of display apparatus which previously has the angle of vergence of some degree, when the images of the object are mutually shifted inwardly, the lines of sight of the observer directed toward the left and right images of the object, as shown in FIG. 4, cross at a position fairly closer than numeral 40 denoting the positions of virtual images produced by the virtual-image stereo-observation type of display apparatus and also the focal positions of the eyes.

In FIG. 4, reference numeral 41 represents a virtual-image stereo-observation type of display apparatus; 42, an eyepiece optical system for the right eye; 43, an eye piece optical system for the left eye; 44, an image display means for the right eye; 45, an image display means for the left eye; 46, an image of the object shifted inwardly, displayed on the image display means for the right eye; 47, an image of the object shifted inwardly, displayed on the image display means for the left eye; 48, an observer; and 49, an intersection of the lines of sight of the observer directed toward the left and right images of the object. The eyepiece optical system 42 for the right eye and the eyepiece optical system 43 for the left eye are arranged to make an angle of vergence α.

As shown in FIGS. 5A and 5B, an object 1001 where it lies horizontally (FIG. 5A) and where it stands upright (FIG. 5B) are imaged by a stereo imaging apparatus 1000 at an angle of vergence α1. Subsequently, as shown in FIGS. 6A and 6B, when the object lying horizontally and the object standing upright, imaged by the stereo imaging apparatus, are observed through the stereo display apparatus which has an angle of vergence α2 appreciably smaller than the angle of vergence a α1 of the stereo imaging apparatus of FIG. 5A, an observation image 1002 of the object lying horizontally is considerably different in length visible to the eye from an observation image 1003 of the object standing upright. As mentioned above, in the stereo-observation system including the stereo imaging apparatus and the stereo display apparatus which are appreciably different in the angle of vergence from each other, the space of the object to be observed may be subjected to strong strain.

SUMMARY OF THE INVENTION

The stereo-observation system of the present invention includes a stereo imaging unit which has at least two entrance pupils and an imaging means forming a first image for the left eye and a second image for the right eye which have parallax and a stereo display unit which has two image display means displaying two images formed by the stereo imaging unit. In this case, the stereo display unit is constructed so that the angle of vergence α2 is made by the line of sight of the left eye of the observer viewing the center of the first image displayed by the image display means with the line of sight of the right eye of the observer viewing the center of the second image displayed by the image display means, and the angle of vergence α2 satisfies the following condition:

$$(\alpha 1 - 2\tan^{-1}(d/2L)) \times (w2/w1) \times 0.83 \leq \alpha 2 \leq \{2\sin^{-1}(G/2D) - (2\tan^{-1}(d/2S) - \alpha 1) \times (w2/w1)\} \times 1.2 \quad (1)$$

where α1 is the angle of vergence (the inward angle) of the stereo imaging unit, d is a distance between the centers of the two entrance pupils of the stereo imaging unit, L is a distance from a far point of the depth of field of the stereo imaging unit to the entrance pupils of the stereo imaging unit, S is a distance from a near point of the depth of field of the stereo imaging unit to the entrance pupils of the stereo imaging unit, w1 is the field angle of the stereo imaging unit, w2 is the field angle of the stereo display unit, G is an interpupillary distance of the observer, and D is a distance from the pupil position of the observer to the observation image.

The stereo-observation system of the present invention preferably satisfies the following condition:

$$0.7 \leq \alpha 1/\alpha 2 \leq 1.7 \quad (2)$$

Experiments show that when the angle of vergence α1 of the stereo imaging unit and the angle of vergence α2 of the stereo display unit satisfy Condition (2), observation can be made without applying the strong strain to the space of the object observed by the stereo-observation system.

The strong strain applied to the space of the object refers to the fact that, for example, in cases where a bar with some length standing upright is observed and where the bar lying horizontally is observed, the lengths of the bars visible to the eye in the depth direction do not entirely coincide. Below the lower limit of Condition (2), the length of the bar standing upright when observed is visible to the eye to be appreciably greater than that of the bar lying horizontally. Beyond the upper limit of Condition (2), the length of the bar lying horizontally is visible to the eye to be appreciably greater than that of the bar standing upright.

According to the stereo-observation system of the present invention, the stereo imaging unit preferably has the depth of field at least 10 times the distance between the centers of the two entrance pupils.

According to the stereo-observation system of the present invention, a stereo-scopic observation that a difficulty, such as a sense of fatigue, is not caused on observation can be realized.

These and other features and advantages of the present invention will become apparent from the following detailed description of the preferred embodiments when taken in conjunction with the accompanying drawings.

BRIEF DESCRIPTION OF THE DRAWINGS

FIGS. 6A and 6B are explanatory views showing the problem of the conventional stereo-observation system;

DETAILED DESCRIPTION OF THE PREFERRED EMBODIMENTS

In accordance with the drawings, the embodiments of the stereo-observation system of the present invention will be described below.

Figure 1:
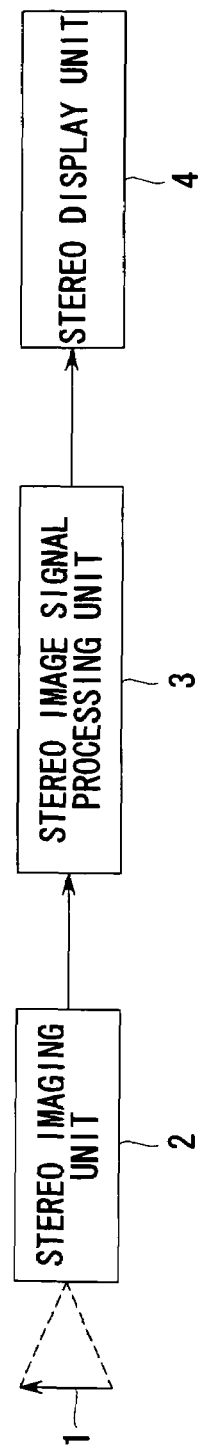
FIG. 1 is a conceptual view showing a stereo-observation system.
Figure 2A:
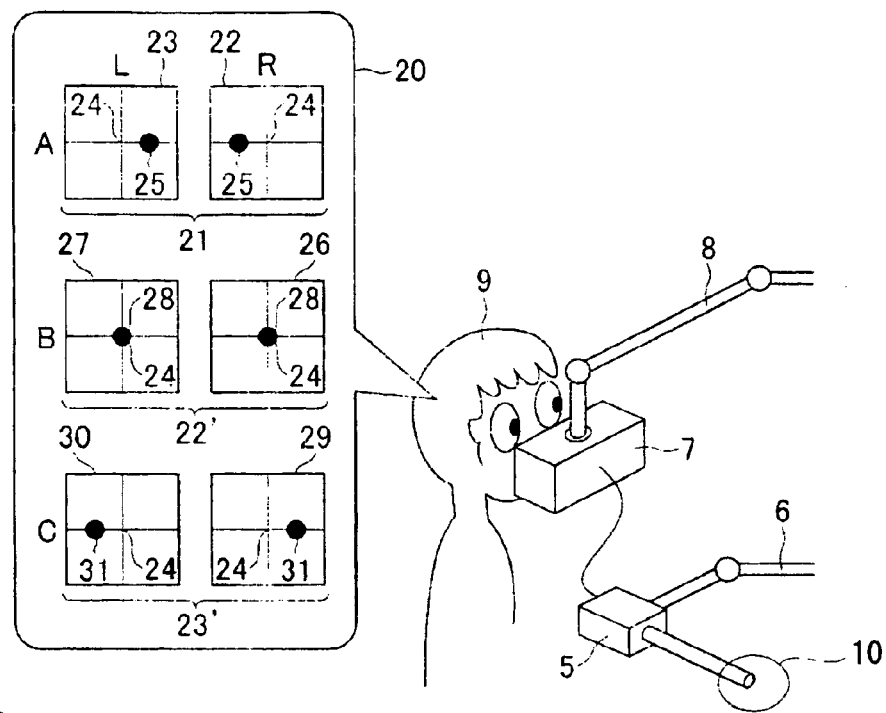
FIGS. 2A and 2B are an entire view and a partially enlarged view, respectively, showing a state of observation by a conventional stereo-observation system.
Figure 2B:
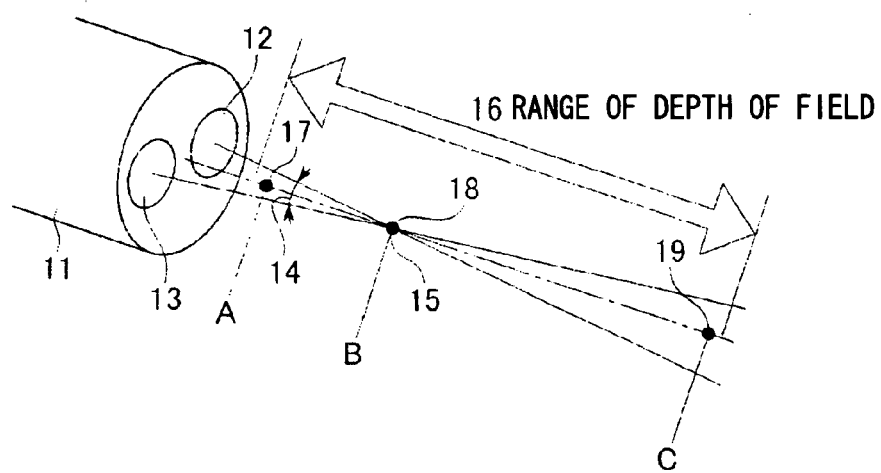
Figure 3:
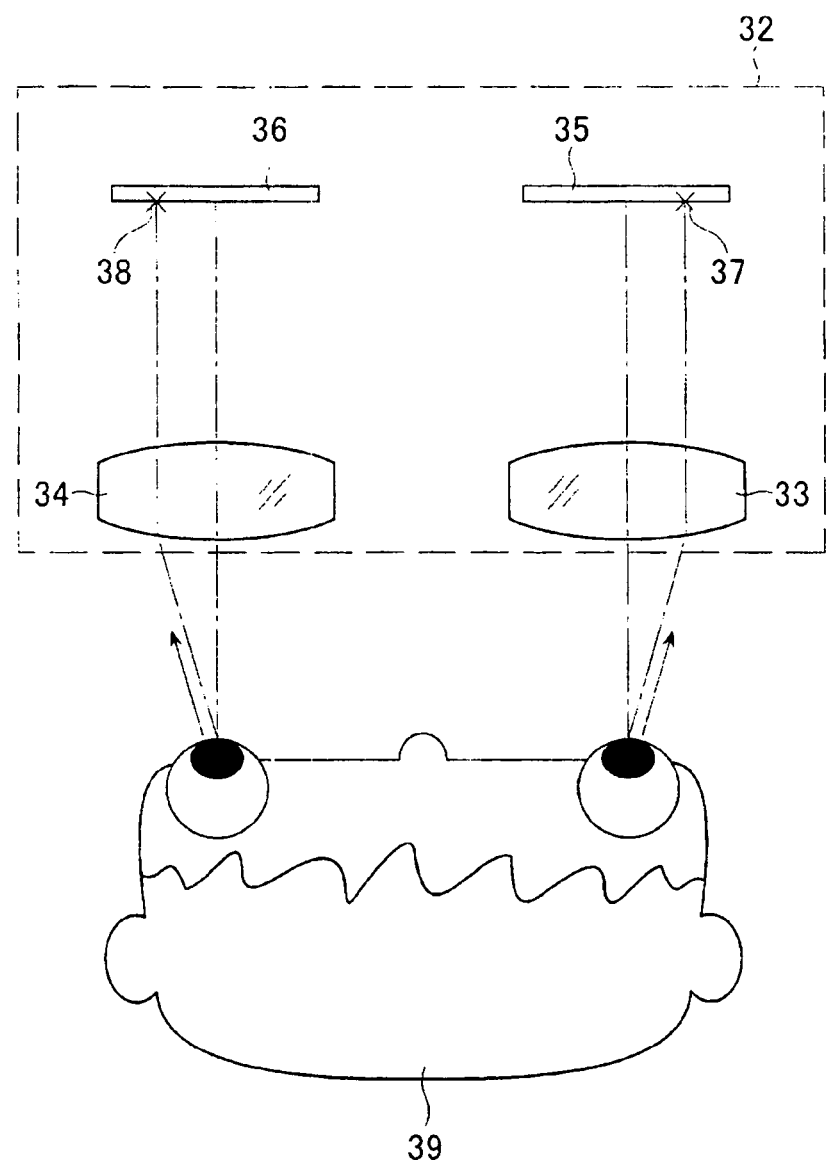
FIG. 3 is an explanatory view showing the conventional stereo-observation system where images of an object are shifted outwardly.
Figure 4:
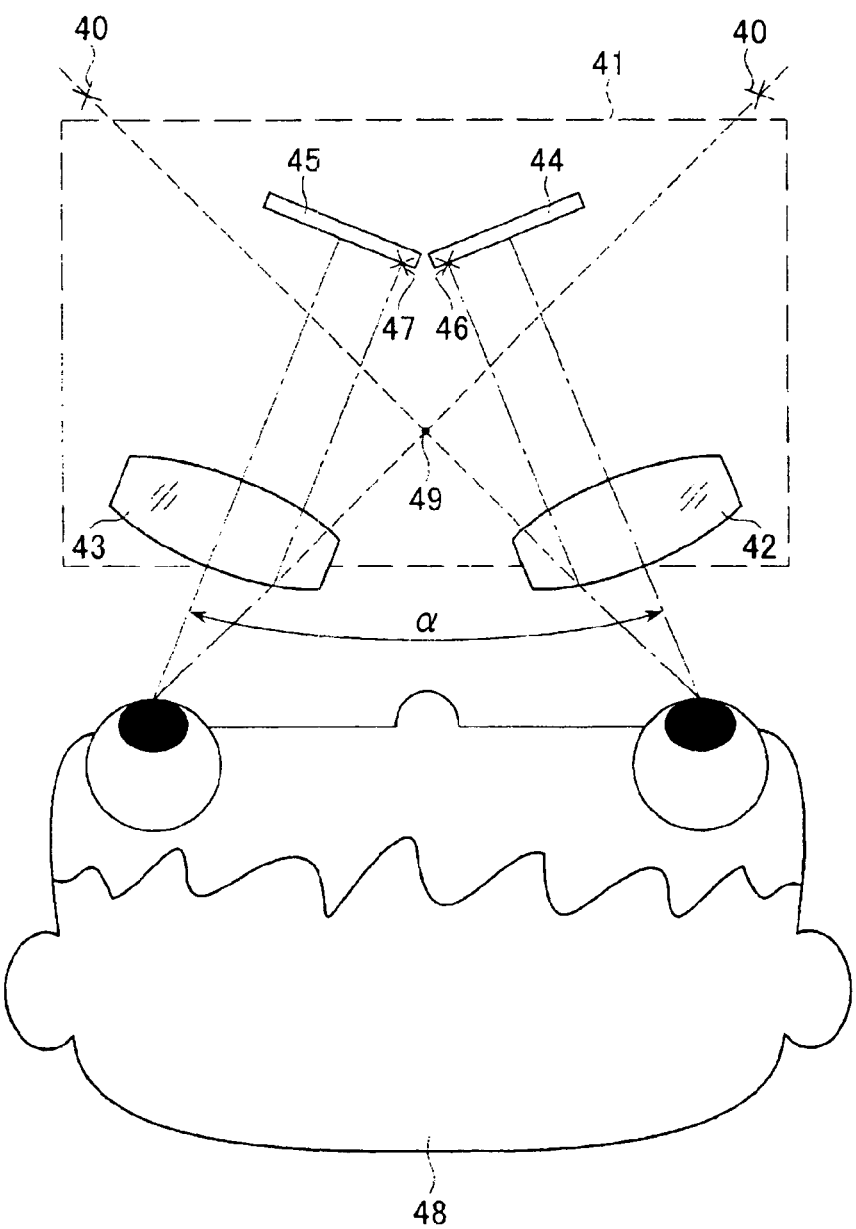
FIG. 4 is an explanatory view showing the conventional stereo-observation system where images of an object are shifted inwardly.
Figures 5A, 5B:
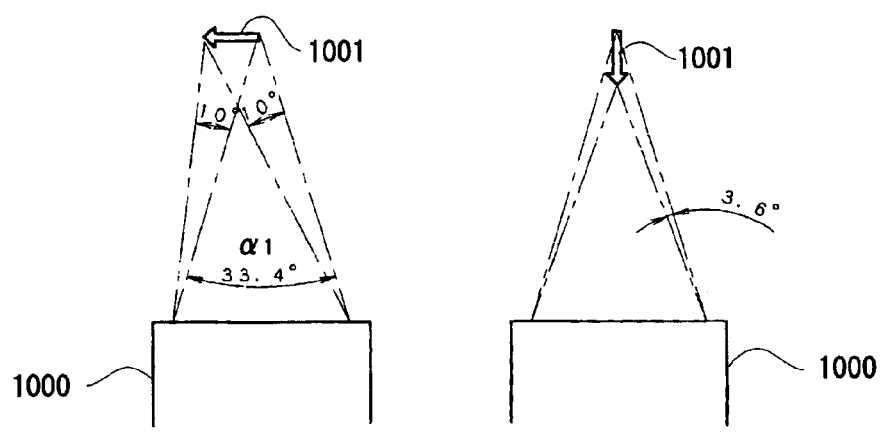
FIGS. 5A and 5B are explanatory views showing the problem of the conventional stereo-observation system.
Figure 7:
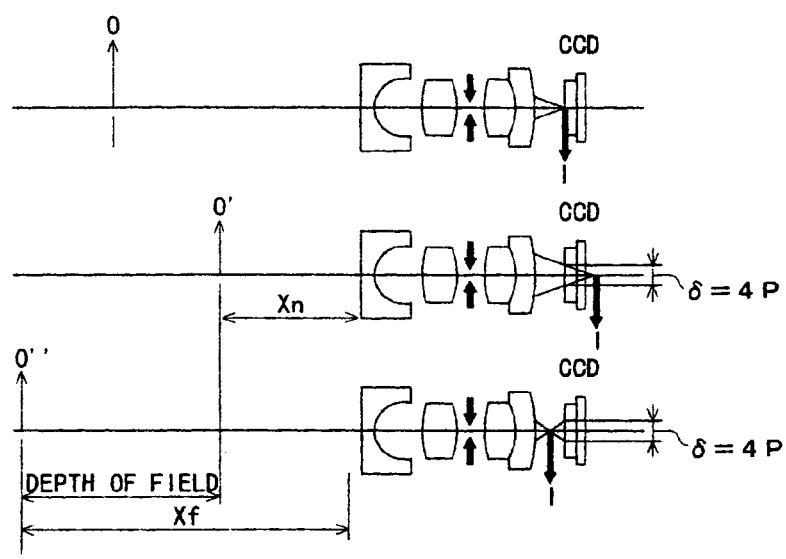
FIG. 7 is an explanatory view for defining a depth of field.

Before undertaking the description of the embodiments, the definition of the depth of field and the advantage of the stereo-observation system of the present invention will be explained. FIG. 7 shows an imaging unit developed along the optical axis. In this figure, an image sensor is located at a position where an image I of an object O is formed, and thereby a focused image can be obtained. However, when the imaging unit is moved close to the object O and the object is moved to the position of O', the image I is shifted and is formed at the position of I'. Conversely, when the imaging unit is moved farther away from the object O and the object is moved to the position of O", the image I is shifted and is formed at the position of I".

Here, when it is assumed that an image sensor CCD is fixed, each of the images I' and I" formed at the image sensor CCD becomes a circle of confusion with a diameter δ. When the diameter δ is four times a pixel pitch P of the image sensor CCD, namely δ=4P, the circle of confusion is not observed as an out-of-focus image, while when δ>4P, it is observed as the out-of-focus image.

Thus, the object is visible to the eye as if it is brought to a focus in the range of distance from the object O' to the object O", and this range is called the depth of field. A distance Xn from the imaging optical system to the object O' is defined as the nearest distance (a near point) in the depth of field, while a distance Xf from the imaging optical system to the object O" is defined as the farthest distance (a far point) in the depth of field. In this case, when the effective aperture ratio (the F-number) of the imaging optical system is represented by Fno and the focal length of the imaging optical system is represented by fL, the following equation is established:

$$|1/Xn - 1/Xf| = 2 \times 4P \times Fno/fL^2$$

Here, a depth of field D is expressed as Xf−Xn.

Figure 8:
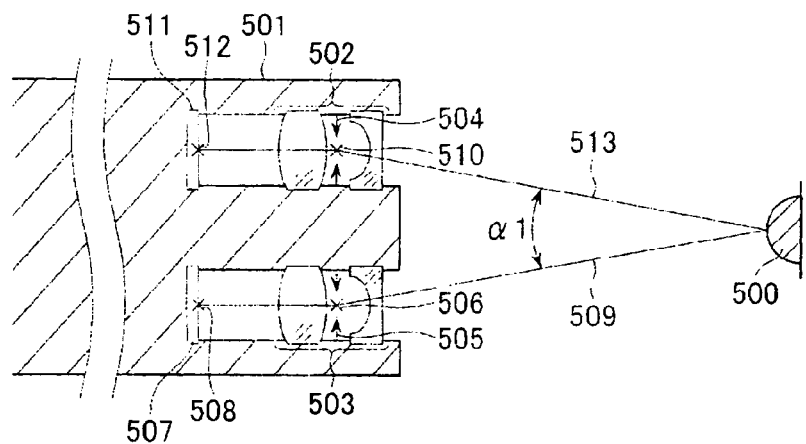
FIG. 8 is an explanatory view for defining an angle of vergence (an inward angle) of a stereo imaging unit.

The angle of vergence (the inward angle) α1 of the stereo imaging unit, as illustrated in FIG. 8, refers to an angle made by a ray 509 with a ray 513. Of entrance pupils 504 and 505 corresponding to optical means 502 and 503, respectively, in a stereo imaging unit 501, the ray 509 emanates from an object 500 and passes though a center 506 of the right-hand entrance pupil 505 and a center 508 of the imaging plane of an imaging means 507 for the right eye, while the ray 513 likewise emanates from the object 500 and passes through a center 510 of the left-hand entrance pupil 504 and a center 512 of the imaging plane of an imaging means 511 for the left eye.

Figure 9:
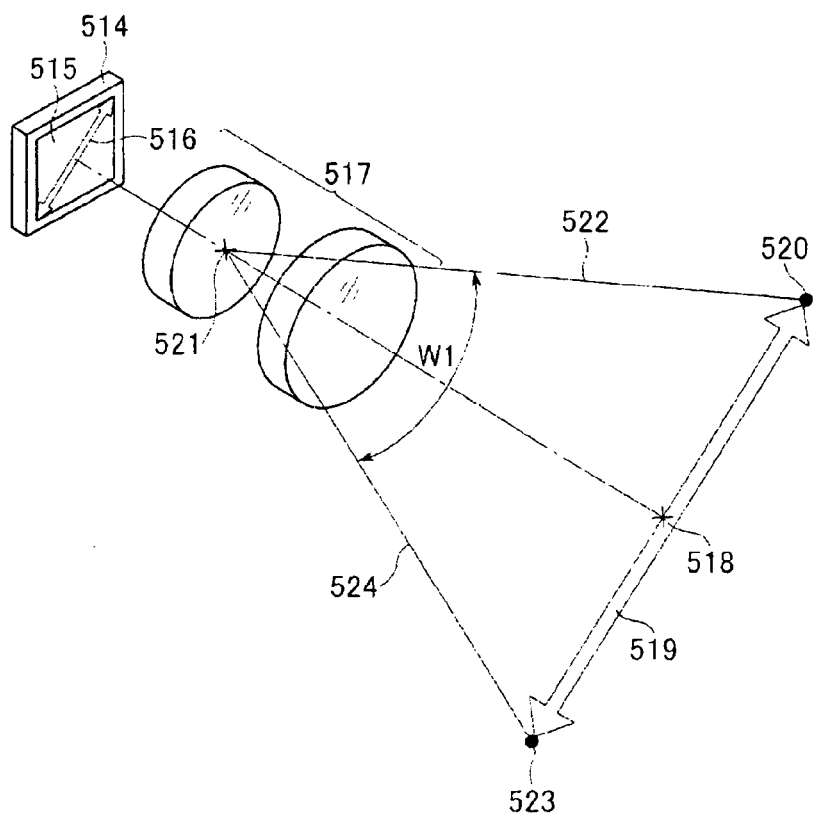
FIG. 9 is an explanatory view for defining a field angle of the stereo imaging unit.

The field angle w1 of the stereo imaging unit, as illustrated in FIG. 9, refers to an angle made by a straight line 522 with a straight line 524. In this case, a diagonal line 516 of an imaging area 515 of an imaging means 514 for the left eye in the stereo imaging unit is projected at a certain position 518 on the object side through an optical means 517 for the left eye. The straight line 522 connects one end 520 of a projected diagonal line 519 and a center 512 of the entrance pupil of the optical means 517 for the left eye, while the straight line 524 connects a remaining end 523 of the diagonal line 519 and the center 512 of the entrance pupil. The same explanation holds for the case of the right eye, and thus the explanation for the right eye is omitted.

Figure 10:
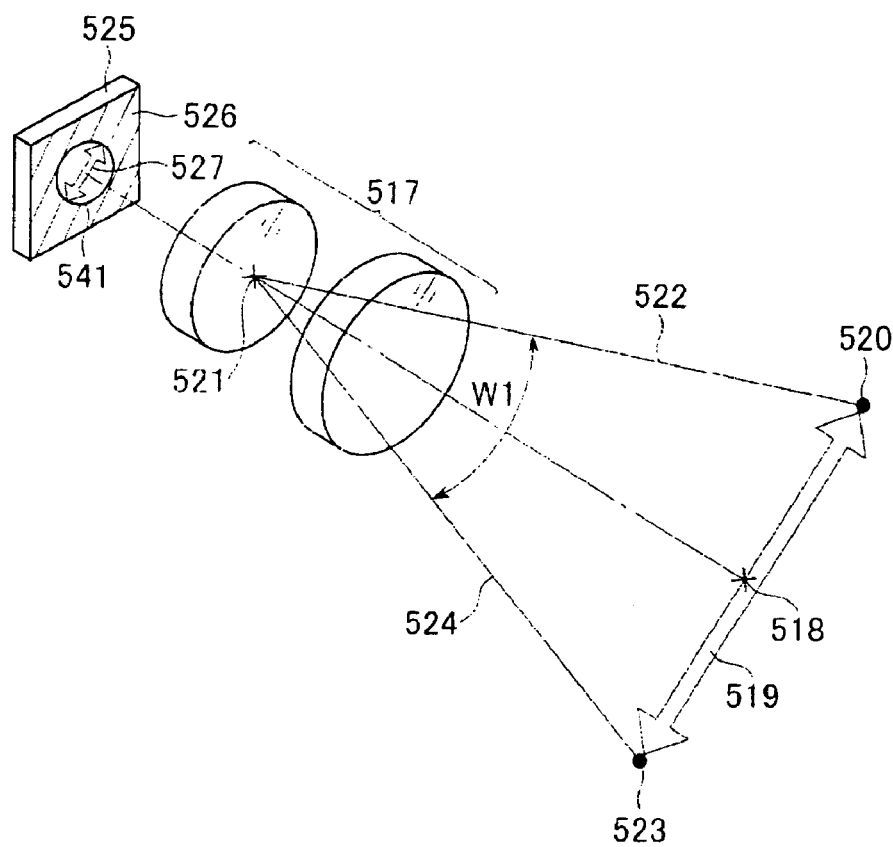
FIG. 10 is an explanatory view for defining the field angle where the configuration of an imaging area is limited.

Also, as shown in FIG. 10, when the shape of the imaging area of an imaging means 525 is limited to a circle by a stop 526 or an electric means, a straight line 527 of the largest length in a limited imaging area 541 is used instead of the diagonal line.

Figure 11:
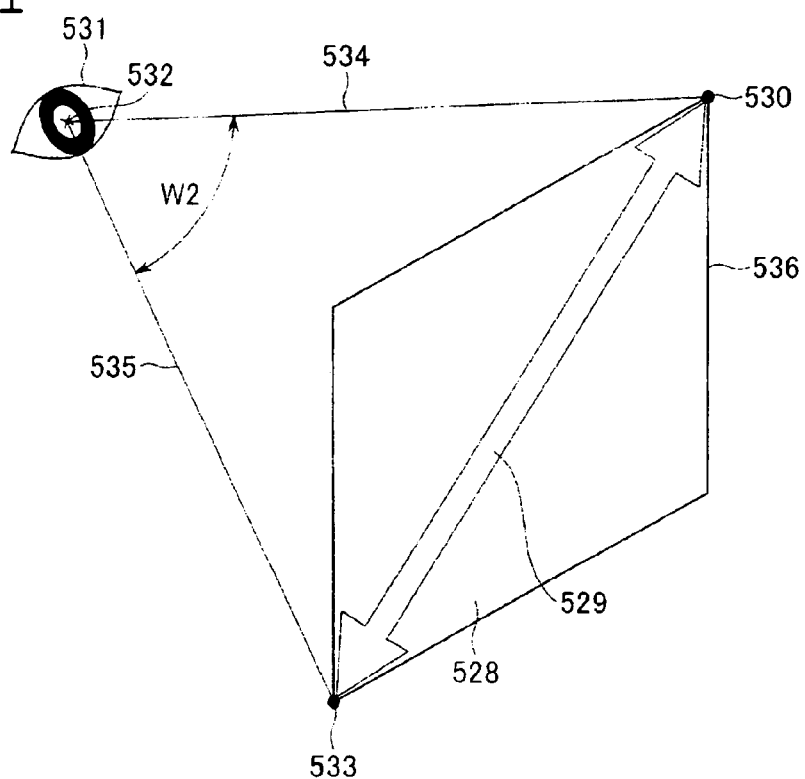
FIG. 11 is an explanatory view for defining a field angle of a stereo display unit.

The field angle w2 of the stereo display unit, as shown in FIG. 11, refers to an angle made by a straight line 534 with a straight line 535. In this case, an image 528 for the left eye is displayed on an image display means 536 for the left eye in the stereo display unit and is viewed by the observer. The straight line 534 connects one end 530 of a diagonal line 529 of the image 528 and a pupil center 532 of a left eye 531 of the observer, while the straight line 535 connects a remaining end 533 of the diagonal line 529 and the pupil center 532 of the left eye 531 of the observer.

Figure 12:
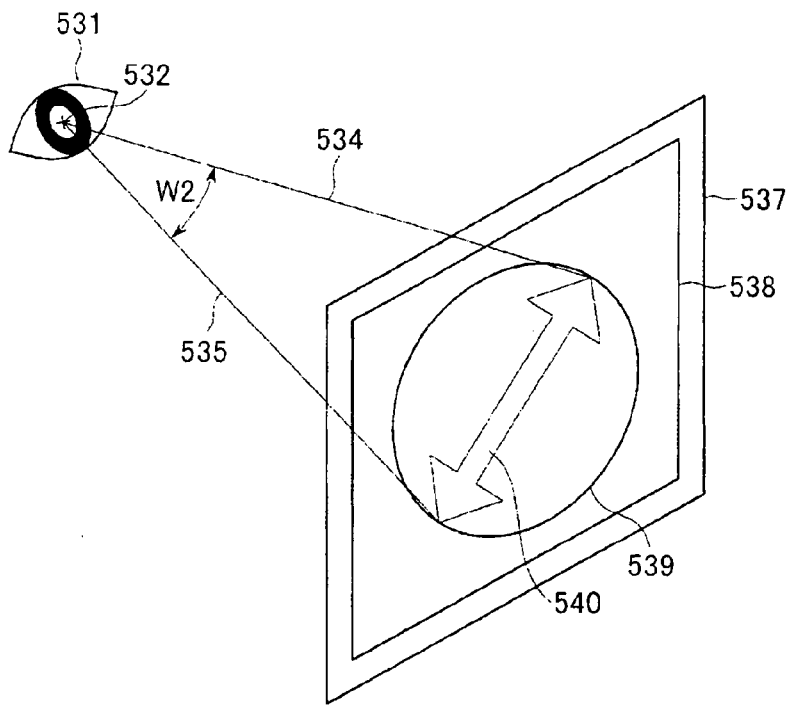
FIG. 12 is an explanatory view for defining the field angle where the configuration of a display area is limited.

The image 528 for the left eye may be formed not as the image itself displayed on the image display means such as that shown in FIG. 12, but as a real mage that the image displayed on the image display means is projected by the optical means. Alternatively, it may be formed as a virtual image likewise projected by the optical means. The same explanation holds for the case of the right eye, and thus the explanation for the right eye is omitted.

Also, as shown in FIG. 12, when the image is limited to a circular shape and is displayed smaller than a display area 538 of an image display means 537, a straight line 540 of the largest length in a limited imaging area 539 is used instead of the diagonal line.

The interpupillary distance G of the observer, which is 55-75 mm, is 65 mm on an average. Where the image to be observed is displayed on the image display means, the distance D from the pupil position of the observer to the observation image corresponds to a distance from the pupil position of the observer to the display surface of the image display means. Where the image to be observed is a real image or virtual image that the image displayed on the image display means is projected by the optical means, the distance D corresponds to a distance from the pupil position of the observer to the real image or virtual image.

According to this construction, even when the stereo imaging unit is moved farthest away from the object in the range of the depth of field and the images of the object observed by the stereo display unit are mutually shifted outwardly from the centers of the observation images, the angle of vergence α2 of the stereo display unit is set so that the angle made by the lines of sight of the observer directed toward the left and right images of the object is canceled. Consequently, the lines of sight of the observer directed toward the left and right images of the object are not shifted outwardly, image fusion can be easily accomplished, and undue fatigue is not experienced.

Even when the stereo imaging unit is moved closest to the object in the range of the depth of field and the images of the object observed by the stereo display unit are mutually shifted inwardly from the centers of the observation images, the angle of vergence α2 of the stereo display unit is set so that an intersection of the lines of sight of the observer directed toward the left and right images is not located ahead of the focal position of the observer's eyes. Consequently, image fusion can be easily accomplished and undue fatigue is not experienced. Thus, the stereoscopic observation that a difficulty, such as a sense of fatigue, is not caused at any time can be realized.

First Embodiment

Figure 13:
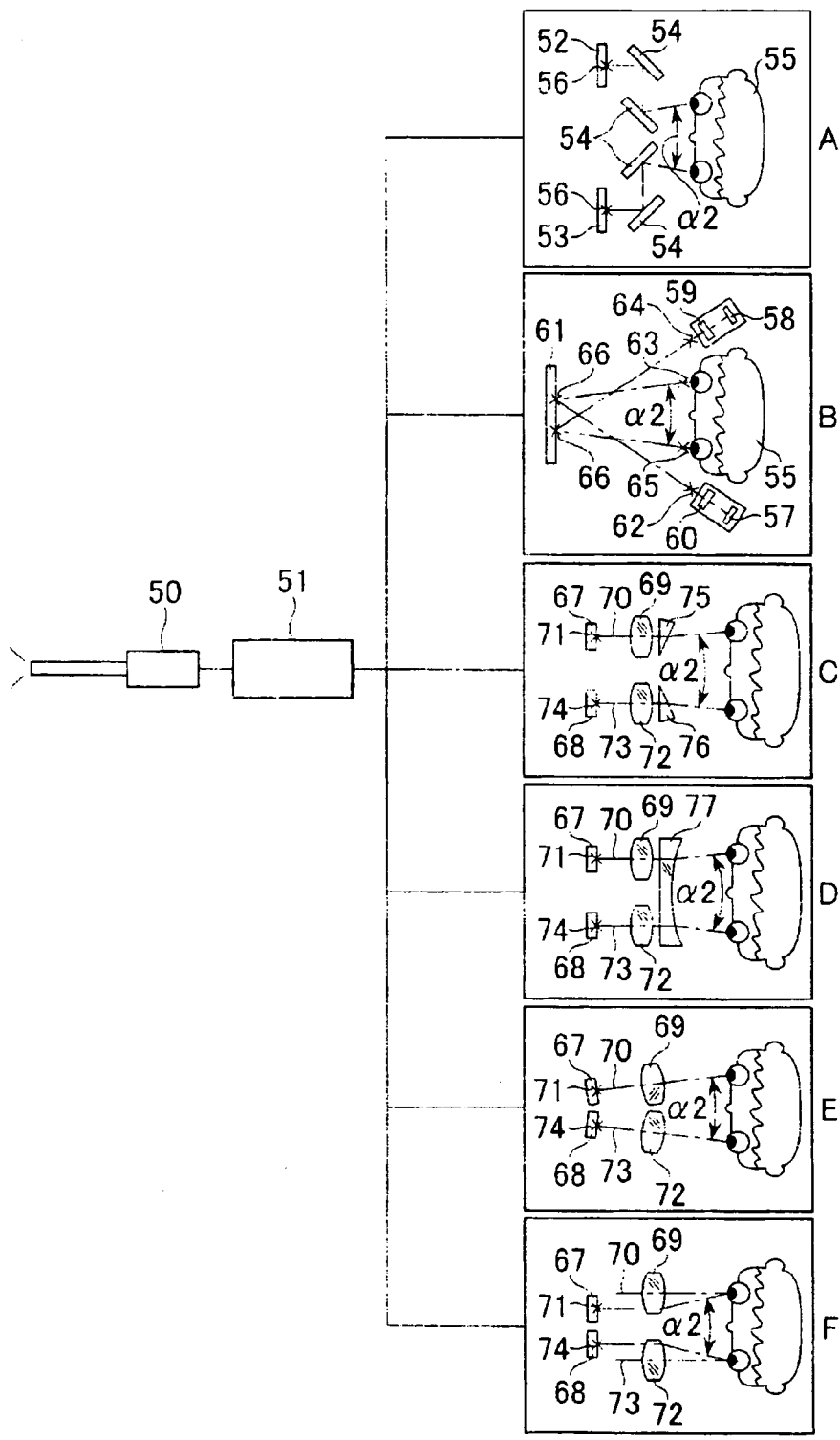
FIG. 13 is a view showing the stereo-observation system of a first embodiment in the present invention.

FIG. 13 shows the stereo-observation system of the first embodiment. The stereo-observation system of this embodiment includes a stereo endoscope unit 50, a stereo image signal processing unit 51, and one of various stereo display units represented by symbols A-F in the figure.

The stereo display unit A is an image display direct observation type of stereo display apparatus. The right and left images formed by the stereo endoscope 50 are displayed on an LCD 52 for the right eye and an LCD 53 for the left eye, respectively, and light beams emanating from the LCDs 52 and 53 for the right and left eyes are introduced into the eyes of an observer 55 by a plurality of mirrors 54. The angle made by the right and left lines of sight of the observer directed toward centers 56 of images displayed on the LCDs 52 and 53 for the right and left eyes is α2.

The stereo display unit B is a real image observation type of stereo display apparatus. The right and left images formed by the stereo endoscope 50 are displayed on an LCD 57 for the right eye and an LCD 58 for the left eye, respectively, and the right and left images are projected together as real images on a screen 61 constructed as a Fresnel concave mirror through a projection optical system 60 for the right eye and a projection optical system 59 for the left eye, respectively. By the screen 61, an exit pupil 62 of the projection optical system 60 for the right eye is projected at a right eye position 63 of the observer 55, while an exit pupil 64 of the projection optical system 59 for the left eye is projected at a left eye position 65 of the observer 55. Thus, from the real images of the images for the right and left eyes projected together on the screen 61, the observer is capable of observing the image for the right eye with the right eye and the image for the left eye with the left eye. The angle made by the right and left lines of sight of the observer directed toward centers 66 of the real images for the right and left eyes is α2.

The stereo display unit C is a virtual image observation type of stereo display apparatus. The right and left images formed by the stereo endoscope 50 are displayed on an LCD 67 for the right eye and an LCD 68 for the left eye, respectively, and an optical axis 70 of an eyepiece optical system 69 for the right eye passes through a center 71 of the image for the right eye. An optical axis 73 of an eyepiece optical system 72 for the left eye passes through a center 74 of the image for the left eye. The optical axes 70 and 73 of the eyepiece optical systems for the right and left eyes are placed in parallel. In addition, wedge prisms 75 and 76 are arranged on the ray-emergence side of the eyepiece optical systems 69 and 72 for the right and left eyes, respectively. Thus, the observer is capable of observing the virtual images of the images for the right and left eyes provided by the eyepiece optical systems for the right and left eyes. Due to the functions of the wedge prisms 75 and 76, the angle made by the right and left lines of sight of the observer directed toward the centers of the virtual images for the right and left eyes is α2.

The stereo display unit D is the virtual image observation type of stereo display apparatus. The right and left images formed by the stereo endoscope 50 are displayed on the LCD 67 for the right eye and the LCD 68 for the left eye, respectively, and the optical axis 70 of the eyepiece optical system 69 for the right eye passes through the center 71 of the image for the right eye. The optical axis 73 of the eyepiece optical system 72 for the left eye passes through the center 74 of the image for the left eye. The optical axes 70 and 73 of the eyepiece optical systems for the right and left eyes are placed in parallel. In addition, a single concave lens 77 is placed on the ray-emergence side of the eyepiece optical systems 69 and 72 for the right and left eyes. Thus, the observer is capable of observing the virtual images of the images for the right and left eyes provided by the eyepiece optical systems for the right and left eyes. Due to the function of the concave lens 77, the angle made by the right and left lines of sight of the observer directed toward the centers of the virtual images for the right and left eyes is α2.

The stereo display unit E is the virtual image observation type of stereo display apparatus. The right and left images formed by the stereo endoscope 50 are displayed on the LCD 67 for the right eye and the LCD 68 for the left eye, respectively, and the optical axis 70 of the eyepiece optical system 69 for the right eye passes through the center 71 of the image for the right eye. The optical axis 73 of the eyepiece optical system 72 for the left eye passes through the center 74 of the image for the left eye. The eyepiece optical systems 69 and 72 for the right and left eyes and the LCDs 67 and 68 for right and left eyes are integrally arranged so that the optical axes 70 and 73 of the eyepiece optical systems for the right and left eyes make the angle of α2. Thus, the observer is capable of observing the virtual images of the images for the right and left eyes provided by the eyepiece optical systems for the right and left eyes. Since the optical axes 70 and 73 of the eyepiece optical systems for the right and left eyes are arranged to make the angle of α2, the angle made by the right and left lines of sight of the observer directed toward the centers of the virtual images for the right and left eyes is α2.

The stereo display unit F is the virtual image observation type of stereo display apparatus. The right and left images formed by the stereo endoscope 50 are displayed on the LCD 67 for the right eye and the LCD 68 for the left eye, respectively, and the optical axis 70 of the eyepiece optical system 69 for the right eye is offset outwardly without passing through the center 71 of the image for the right eye. The optical axis 73 of the eyepiece optical system 72 is offset outwardly without passing through the center 74 of the image for the left eye. Thus, the observer is capable of observing the virtual images of the images for the right and left eyes provided by the eyepiece optical systems for the right and left eyes. Since the optical axes 70 and 73 of the eyepiece optical systems for the right and left eyes are offset outwardly from the centers 71 and 74 of the images for the right and left eyes, the angle made by the right and left lines of sight of the observer directed toward the centers of the virtual images for the right and left eyes is α2.

When each of the stereo display units A-F is observed by an observer with an interpupillary distance of 65 mm, the values of the field angle w2, the angle of vergence α2, and the distance D from the pupil position of the observer to the observation image are the same in any display unit, namely w2=35.2°, α2=5.6°, and D=430 mm. Further, the angle of vergence α1 of the stereo endoscope unit 50 is 6.93°, the distance d between the centers of the two entrance pupils is 4.6 mm, the distance L from the position farthest away from the stereo endoscope unit (a far point) in the range of the depth of field to the entrance pupil is 100 mm, the distance S from the position closest to the stereo endoscope unit (a near point) in the range of the depth of field to the entrance pupil is 20 mm, and the field angle w1 is 60°.

Substitution of the values of the above parameters in Condition (1) gives $$2.1° \leq \alpha2 \leq 6.05°$$

The angle of vergence α2 in each of the display units A-F is 5.6°, which satisfies Condition (1). Thus, even when the stereo endoscope unit is moved farthest away from the object in the range of the depth of field and the images of the object observed by the stereo display unit are shifted outwardly from the centers of the observation images, the angle of vergence α2 of the stereo display unit is set so that the angle made by the lines of sight of the observer directed toward the left and right images of the object is canceled. Consequently, since the lines of sight of the observer directed toward the left and right images of the object are not shifted outwardly and image fusion can be easily accomplished, undue fatigue is not experienced.

Even when the stereo endoscope unit is moved closest to the object in the range of the depth of field and the images of the object observed by the stereo display unit are shifted inwardly from the centers of the observation images, the angle of vergence α2 of the stereo display unit is set so that an intersection of the lines of sight of the observer directed toward the left and right images is not located ahead of the focal position of the observer's eyes. Consequently, image fusion can be easily accomplished and undue fatigue is not experienced. Thus, the stereoscopic observation that a difficulty, such as a sense of fatigue, is not caused at any time can be carried out.

Moreover, the relation between the angle of vergence α1 of the stereo endoscope unit and the angle of vergence α2 of each of the display units A-F is expressed by α1/α2=1.23, which satisfies Condition (2). The observer is thus capable of making observation without applying the strong strain to the space of the object observed by the stereo-observation system.

Second Embodiment

Figure 14:
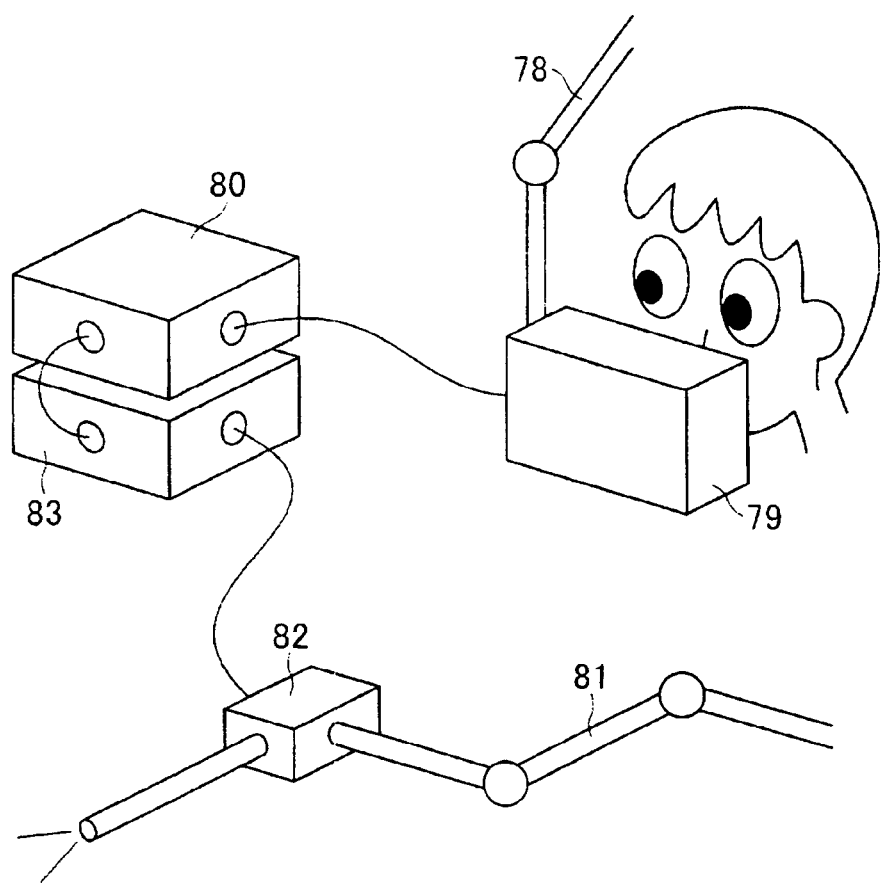
FIG. 14 is a view showing the stereo-observation system of a second embodiment in the present invention.

FIG. 14 shows the stereo-observation system of the second embodiment. The stereo-observation system of this embodiment includes a virtual-image stereo-observation type of display apparatus 79 sustained by a holding arm 78, a display controller unit 80, a stereo endoscope 82 sustained by a stereo endoscope holding arm 81, and a stereo image signal processing unit 83.

Figure 15:
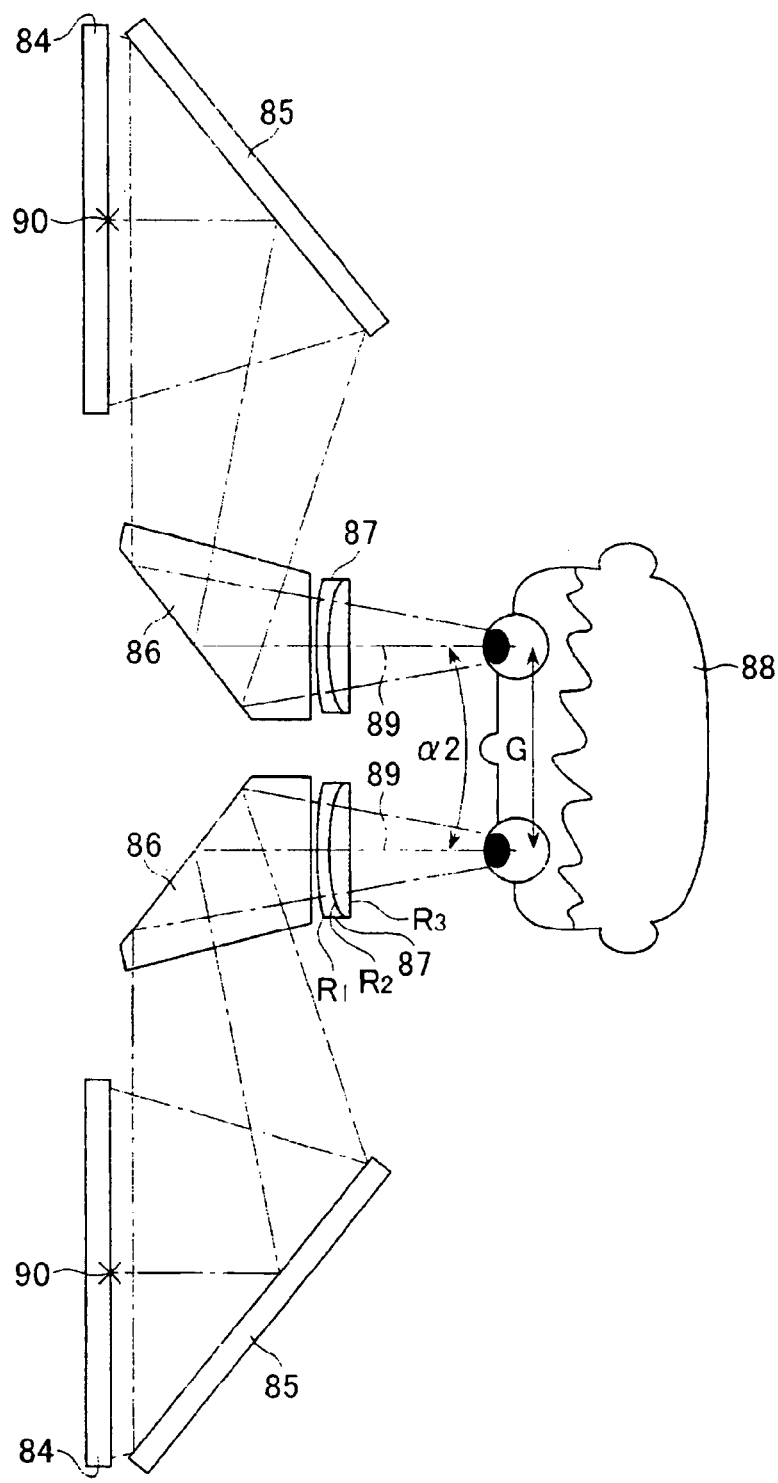
FIG. 15 is a sectional view showing an optical system of the display apparatus of the second embodiment in the present invention.

FIG. 15 shows an arrangement of the optical system of the virtual-image stereo-observation type of display apparatus in the second embodiment. In this figure, reference numeral 84 denotes transmission-type LCDs, each having a diagonal length of 6 inches; 85, path deflecting mirrors; 86, path deflecting prisms; 87, eyepiece optical systems; and 88, an observer. The left and right images formed by the stereo endoscope 82 are displayed on the display surfaces of the transmission-type LCDs 84, and the observer 88 can observe the left and right images as the virtual images through the eyepiece optical systems 87.

Optical axes 89 of the eyepiece optical systems 87 pass through centers 90 of the images displayed on the display surfaces of the transmission-type LCDs 84 by the path deflecting prisms 86 and the path deflecting mirrors 85. The optical axes 89 of the left and right eyepiece optical systems are arranged to make the angle of vergence α2 due to the path deflecting prisms 86. Also, in the virtual-image stereo-observation type of display apparatus of the second embodiment, the angle of vergence α2 is 5.6°, the field angle w2 is 35.2°, the distance D from the position of the virtual image of the observation image formed by each of the eyepiece optical systems 87 to the observer's eye is 430 mm, and the interpupillary distance of the observer is 65 mm.

Lens data of the optical system of the virtual-image stereo-observation type of display apparatus in the second embodiment are shown below.

| | Curvature | Space distance | Refractive index of glass material | Dispersion of glass material |
|---|---|---|---|---|
| LCD surface | Flat | 52.5 | | |
| Mirror reflecting surface | Flat | 109.5 | | |
| Prism entrance surface | Flat | 32.5 | 1.52 | 64.1 |
| Prism reflecting surface | Flat | 35.5 | 1.52 | 64.1 |
| Prism exit surface | Flat | 1 | | |
| R1 | 163.082 | 4.3 | 1.58 | 41.5 |
| R2 | 64.347 | 5.7 | 1.49 | 70.2 |
| R3 | Flat | 47.5 | | |
| Eyepoint | — | −430 | | |
| Virtual image position | — | | | |

Figure 16A:
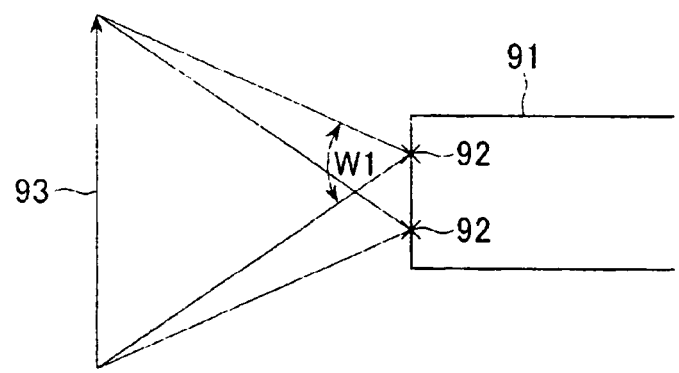
FIGS. 16A and 16B are detail views showing the stereo endoscope of the second embodiment in the present invention.
Figure 16B:
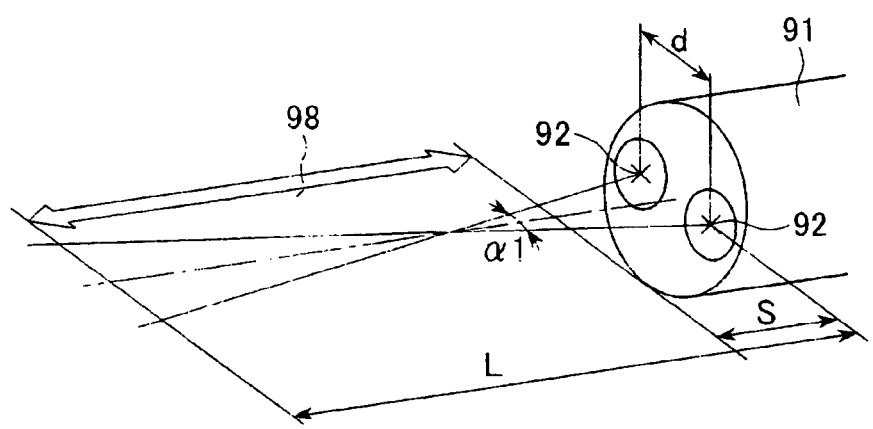

Subsequently, the detail of the stereo endoscope of the second embodiment is shown in FIGS. 16A and 16B. FIG. 16A illustrates the field angle w1 of the stereo endoscope of the second embodiment. Reference numeral 91 denotes a stereo endoscope, 92 denotes the centers of the entrance pupils of the stereo endoscope, and 93 denotes an object imaged by the stereo endoscope. In the second embodiment, the field angle w1 of the stereo endoscope is 60°. FIG. 16B illustrates the angle of vergence α1 of the stereo endoscope of the second embodiment, the distance L from the far point to the entrance pupils of the stereo endoscope, the distance S from the near point to the entrance pupils of the stereo endoscope, and the distance d between the centers of the left and right entrance pupils of the stereo endoscope. Reference numeral 98 denotes the range of the depth of field of the stereo endoscope.

In the second embodiment, α1=6.93°, w1=60°, L=100 mm, S=20 mm, and d=4.6 mm. Substitution of the values of these parameters in Condition (1) gives $2.1° \leq \alpha2 \leq 6.05°$. The angle of vergence α2 of the virtual-image stereo-observation type of display apparatus in the second embodiment is 5.6°, which satisfies Condition (1). Thus, even when the stereo endoscope is moved farthest away from the object in the range of the depth of field and the images of the object observed by the virtual-image stereo-observation type of display apparatus are mutually shifted outwardly from the centers of the observation images, the angle of vergence α2 of the virtual-image stereo-observation type of display apparatus is set so that the angle made by the lines of sight of the observer directed toward the left and right images of the object is canceled. Consequently, since the lines of sight of the observer directed toward the left and right images of the object are not shifted outwardly and image fusion can be easily accomplished, undue fatigue is not experienced.

Even when the stereo endoscope is moved closest to the object in the range of the depth of field and the images of the object observed by the virtual-image stereo-observation type of display apparatus are shifted inwardly from the centers of the observation images, the angle of vergence α2 of the virtual-image stereo-observation type of display apparatus is set so that an intersection of the lines of sight of the observer directed toward the left and right images is not located ahead of the focal position of the observer's eyes. Consequently, image fusion can be easily accomplished and undue fatigue is not experienced. Thus, the stereoscopic observation that a difficulty, such as a sense of fatigue, is not caused at any time can be carried out.

Moreover, the relation between the angle of vergence α1 of the stereo endoscope and the angle of vergence α2 of the virtual-image stereo-observation type of display apparatus is expressed by α1/α2=1.23, which satisfies Condition (2). The observer is thus capable of making observation without applying the strong strain to the space of the object observed by the stereo-observation system.

Third Embodiment

Figure 17:
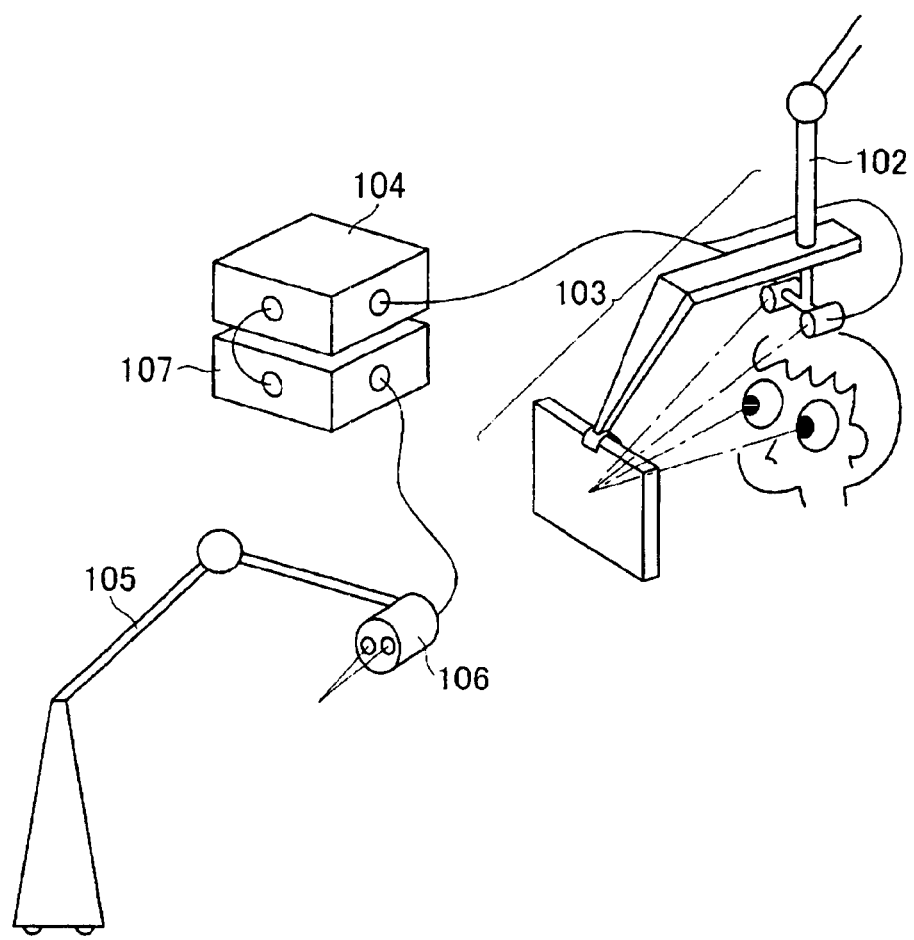
FIG. 17 is a view showing the stereo-observation system of a third embodiment in the present invention.

FIG. 17 shows the stereo-observation system of the third embodiment. The stereo-observation system of this embodiment includes a real-image stereo-observation type of display apparatus 103 sustained by a holding arm 102, a display controller unit 104, a stereomicroscope 106 sustained by a stereomicroscope holding arm 105, and a stereo image signal processing unit 107.

Figure 18:
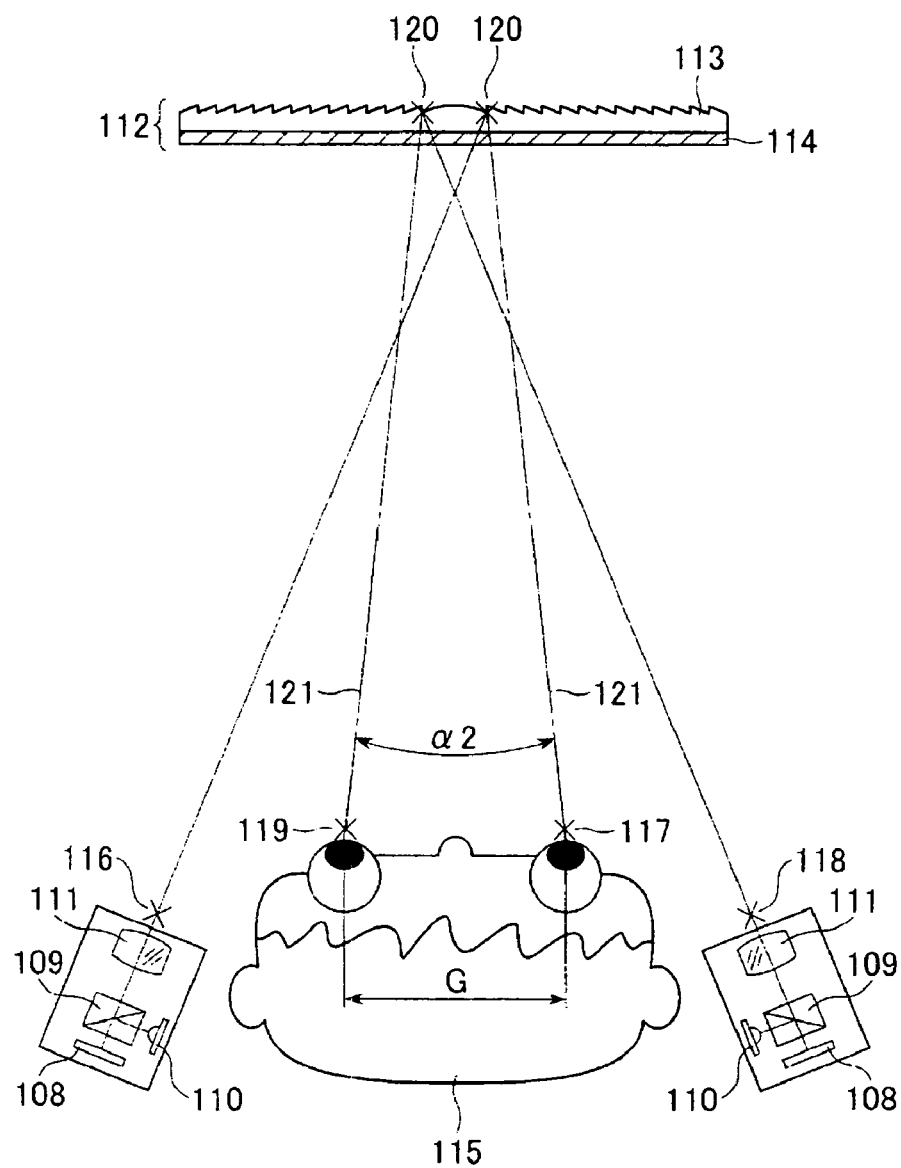
FIG. 18 is a sectional view showing an optical system of the display apparatus of the third embodiment in the present invention.

FIG. 18 shows an arrangement of the optical system of the real-image stereo-observation type of display apparatus in the third embodiment. In this figure, reference numeral 108 denotes reflection-type LCDs; 109, beam splitters; 110, LED light sources for reflection-type LCDs, 111, projection optical systems; 112, a reflecting screen including a Fresnel concave mirror 113 and a transmission-type hologram diffuser 114; and 115, an observer.

The right and left images formed by the stereomicroscope 106 are displayed on the display surfaces of the reflection-type LCDs 108 and are projected together as real images in close proximity to the reflecting screen 112 by the projection optical systems 111. By the lens and diffusion functions of the reflecting screen 112, an exit pupil 116 of the projection optical system for the right eye is magnified and projected at a right eye position 117 of the observer, while an exit pupil 118 of the projection optical system for the left eye is magnified and projected at a left eye position 119 of the observer. Thus, from the real images of the images for the right and left eyes projected together on the reflecting screen 112, the observer is capable of observing the image for the right eye with the right eye and the image for the left eye with the left eye. The right and left lines of sight 121 of the observer directed toward centers 120 of the real images for the right and left eyes is arranged to make the angle of vergence α2. Also, in the real-image stereo-observation type of display apparatus of the third embodiment, the angle of vergence α2 is 5.3°, the field angle w2 is 36.9°, the distance D from the position of the real images to the observer's eyes is 450 mm, and the interpupillary distance G of the observer is 65 mm.

Figure 19A:
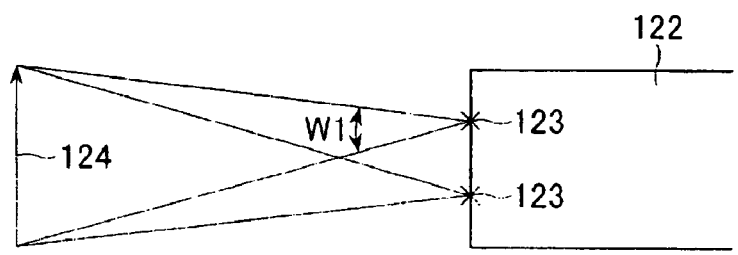
FIGS. 19A and 19B are detail views showing the stereomicroscope of the third embodiment in the present invention.
Figure 19B:
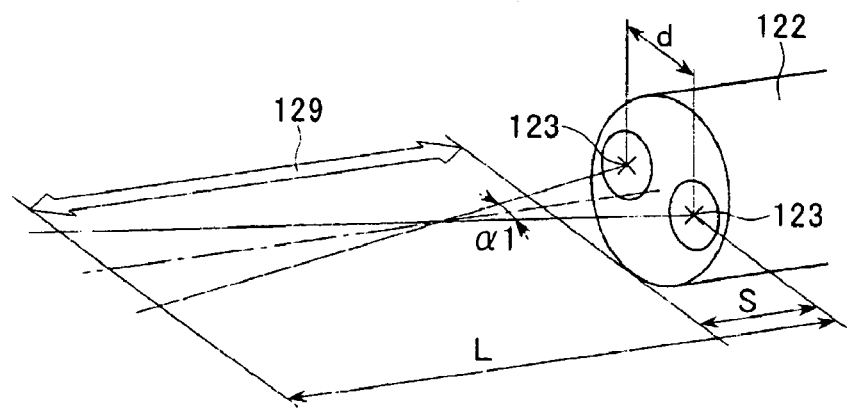

FIGS. 19A and 19B show the detail of the stereomicroscope in the third embodiment. FIG. 19A illustrates the field angle w1 of the stereomicroscope of the third embodiment. Reference numeral 122 denotes a stereomicroscope, 123 denotes the centers of the entrance pupils of the stereomicroscope, and 124 denotes an object imaged by the stereomicroscope. In the third embodiment, the field angle w1 of the stereomicroscope is 30°. FIG. 19B illustrate the angle of vergence al of the stereomicroscope of the third embodiment, the distance L from the far point to the entrance pupils of the stereomicroscope, the distance S from the near point to the entrance pupils of the stereomicroscope, and the distance d between the centers of the left and right entrance pupils of the stereomicroscope. Reference numeral 129 denotes the range of the depth of field of the stereomicroscope.

In the stereomicroscope of the third embodiment, α1=6.93°, w1=30°, L=370 mm, S=160 mm, and d=21 mm. Substitution of the values of these parameters in Condition (1) gives 3.76°≦α2≦9.08°. The angle of vergence α2 of the real-image stereo-observation type of display apparatus of the third embodiment is 5.3°, which satisfies Condition (1). Thus, even when the stereomicroscope is moved farthest away from the object in the range of the depth of field and the images of the object observed by the real-image stereo-observation type of display apparatus are mutually shifted outwardly from the centers of the observation images, the angle of vergence α2 of the real-image stereo-observation type of display apparatus is set so that the angle made by the lines of sight of the observer directed toward the left and right images of the object is canceled. Consequently, since the lines of sight of the observer directed toward the left and right images of the object are not shifted outwardly and image fusion can be easily accomplished, undue fatigue is not experienced.

Even when the stereomicroscope is moved closest to the object in the range of the depth of field and the images of the object observed by the real-image stereo-observation type of display apparatus are shifted inwardly from the centers of the observation images, the angle of vergence α2 of the real-image stereo-observation type of display apparatus is set so that an intersection of the lines of sight of the observer directed toward the left and right images is not located ahead of the focal position of the observer's eyes. Consequently, image fusion can be easily accomplished and undue fatigue is not experienced. Thus, the stereoscopic observation that a difficulty, such as a sense of fatigue, is not caused at any time can be carried out.

Moreover, the relation between the angle of vergence al of the stereomicroscope and the angle of vergence α2 of the real-image stereo-observation type of display apparatus is expressed by α1/α2=1.31, which satisfies Condition (2). The observer is thus capable of making observation without applying the strong strain to the space of the object observed by the stereo-observation system.

What is claimed is:

1. A stereo-observation system comprising:
  a stereo imaging unit having at least two entrance pupils and imaging means forming a first image for the left eye and a second image for the right eye which have parallax; and
  a stereo display unit having two image display means displaying two images formed by the stereo imaging unit,
  wherein the stereo display unit is constructed so that an angle of vergence α2 is made by a line of sight of a left eye of an observer viewing a center of the first image displayed by the image display means with a line of sight of a right eye of the observer viewing a center of the second image displayed by the image display means, and the angle of vergence $\alpha 2$ satisfies the following condition:

$$\alpha 1 - 2\tan^{-1}(d/2L) \times (w2/w1) \times 0.83 \leq \alpha 2 \leq \{2\sin^{-1}(G/2D - (2\tan^{-1}(d/2S) - \alpha 1) \times (w2/w1)\} \times 1.2$$

where $\alpha 1$ is an angle of vergence (an inward angle) of the stereo imaging unit, d is a distance between centers of the two entrance pupils of the stereo imaging unit, L is a distance from a far point of a depth of field of the stereo imaging unit to the entrance pupils of the stereo imaging unit, S is a distance from a near point of the depth of field of the stereo imaging unit to the entrance pupils of the stereo imaging unit, w1 is a field angle of the stereo imaging unit, w2 is a field angle of the stereo display unit, G is an interpupillary distance of the observer, and D is a distance from a pupil position of the observer to an observation image.

2. A stereo-observation system according to claim 1, further satisfying the following condition:

$$0.7 \leq \alpha 1/\alpha 2 \leq 1.7$$

3. A stereo-observation system according to claim 1 or 2, wherein the stereo imaging unit has the depth of field at least 10 times the distance between the centers of the two entrance pupils.

* * * * *